United States Patent
Noda et al.

(10) Patent No.: US 10,665,394 B2
(45) Date of Patent: May 26, 2020

(54) SOLID ELECTROLYTIC CONDENSER AND METHOD OF MANUFACTURING THE SAME

(71) Applicant: ROHM CO., LTD., Kyoto (JP)

(72) Inventors: Masahiro Noda, Kyoto (JP); Takeshi Miura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/342,777

(22) Filed: Nov. 3, 2016

(65) Prior Publication Data

US 2017/0133164 A1     May 11, 2017

(30) Foreign Application Priority Data

Nov. 10, 2015    (JP) ................................. 2015-220321

(51) Int. Cl.
    *H01G 9/26*       (2006.01)
    *H01G 9/012*     (2006.01)
    (Continued)

(52) U.S. Cl.
    CPC ............. *H01G 9/26* (2013.01); *H01G 9/0029* (2013.01); *H01G 9/012* (2013.01); *H01G 9/02* (2013.01);
    (Continued)

(58) Field of Classification Search
    CPC ........ H01G 9/26; H01G 9/0029; H01G 9/012; H01G 9/02; H01G 9/025; H01G 9/042;
    (Continued)

(56) References Cited

U.S. PATENT DOCUMENTS

2006/0001069 A1*   1/2006   Tomonaga ........... H01G 4/1218
                                                                   257/306
2009/0147448 A1*   6/2009   Matsuoka .............. H01G 9/012
                                                                   361/540
(Continued)

FOREIGN PATENT DOCUMENTS

JP           2005353709       12/2005
JP           2006179886 A     7/2006
(Continued)

*Primary Examiner* — Michael P McFadden
(74) *Attorney, Agent, or Firm* — Hamre, Schumann, Mueller & Larson, P.C.

(57) ABSTRACT

A solid electrolyte condenser includes two condenser components disposed along a first direction Z and connected in parallel. Each condenser component includes: a porous sintered body forming an anode; an anode wire having a portion being inserted into the porous sintered body; a dielectric layer covering the porous sintered body; and a cathode portion forming a cathode. The solid electrolyte condenser includes: a spacer, which is conductive and of which two ends in the first direction Z are respectively connected with the anode wires; an anode terminal, fixed to a side of the spacer that is opposite to the two condenser components; a cathode terminal, connected with each cathode portion at the two sides in the first direction Z; a sealing resin, covering the two condenser components; and an anode connection portion, fixed at the anode terminal of the spacer and formed along the first direction Z.

17 Claims, 12 Drawing Sheets

(51) Int. Cl.
*H01G 9/00* (2006.01)
*H01G 9/02* (2006.01)
*H01G 9/025* (2006.01)
*H01G 9/042* (2006.01)
*H01G 9/052* (2006.01)
*H01G 9/07* (2006.01)
*H01G 9/10* (2006.01)
*H01G 9/15* (2006.01)

(52) U.S. Cl.
CPC ............ *H01G 9/025* (2013.01); *H01G 9/042* (2013.01); *H01G 9/052* (2013.01); *H01G 9/07* (2013.01); *H01G 9/10* (2013.01); *H01G 9/15* (2013.01)

(58) Field of Classification Search
CPC ............ H01G 9/052; H01G 9/07; H01G 9/10; H01G 9/15
USPC .......................................... 361/529
See application file for complete search history.

(56) References Cited

U.S. PATENT DOCUMENTS

| | | | |
|---|---|---|---|
| 2010/0149729 A1* | 6/2010 | Nishioka | B22F 1/02 361/525 |
| 2011/0128675 A1* | 6/2011 | Merker | H01G 9/0036 361/523 |
| 2011/0205689 A1* | 8/2011 | Vilcova | H01G 9/012 361/525 |
| 2012/0275083 A1* | 11/2012 | Yamanaka | H01G 9/012 361/523 |
| 2014/0321025 A1* | 10/2014 | Saito | C25D 5/12 361/305 |

FOREIGN PATENT DOCUMENTS

| | | |
|---|---|---|
| JP | 2010147234 | 7/2010 |
| JP | 2010147234 A | 7/2010 |
| JP | 2012222262 A | 11/2012 |
| JP | 2015167182 A | 9/2015 |

* cited by examiner

SOLID ELECTROLYTIC CONDENSER AND METHOD OF MANUFACTURING THE SAME

TECHNICAL FIELD

The present invention is related to, in particular, solid electrolyte condensers having a condenser component that comprises an anode having a sintered body with a valve metal and is encased in a surface mounted resin package and methods of manufacturing the same.valve metalvalve metal

BACKGROUND

With the development in the miniaturization and complex functionality of electronic devices in recent years, the power supplied to the electronic devices shall be operated in the high-frequency area. Accordingly, noise control and source-voltage smoothing are required, and consequently, the functions performed by the capacitor in the electronic circuit are becoming more and more important in electronic componentry. There is a high demand for solid electrolyte condensers that are more compact and have greater electrostatic capacitance and excellent frequency characteristics providing low impedance.

Generally, the impedance of a condenser in a low frequency range depends on the electrostatic capacitance and the equivalent series resistance (ESR), wherein the frequency of the low frequency range is lower than the self-resonant frequency at which the ESR is equivalent to the resistance. Moreover, in the high frequency range having a frequency higher than the self-resonant frequency, the impedance is increased due to the equivalent series inductance or lead inductance (ESL) effect. In this case, ESR plays a more important role than ESL in the impedance characteristics of the solid electrolyte condenser; therefore, by seeking to decrease the ESR in the solid electrolyte condenser it is feasible to efficiently and effectively decrease the resistance.

To reduce the ESR in the solid electrolyte condenser, one solution employed is to connect two condenser components in parallel in a package. Using this solution, a greater electrostatic capacitance is obtained while reducing the ESR. The solid electrolyte condensers disclosed in Patent Literature 1 and Patent Literature 2 are examples of solid electrolyte condensers using this solution.

Patent Literature 1 discloses an example of a solid electrolyte condenser, in which two capacitor components are laterally connected in parallel at one side of the cathode terminal. The anode terminal of the solid electrolyte condenser as a single lead frame, when viewed from said lateral direction, has a ⊐-shape formed by bending processing, and is formed by making the portion of the anode wire, that is connected to the capacitor components, to have a greater width. Moreover, the anode wire is disposed eccentrically in said lateral direction relative to the center of the condenser component. In this way, when using resistance spot welding to connect the anode wire to the anode terminal, a wider space between the two welded portions (anode wire and anode terminal) is provided to avoid the defective welding of each welded portion, and to achieve a sufficient welding strength. However, in the solid electrolyte condenser, in order to reduce the ESR, the condenser component should be made into a planar shape in order to ensure a sufficient connecting area of the cathode terminal with respect to the condenser component. Such configuration of the condenser component may result in the increased size of the package.

Patent Literature 2 discloses an example of a solid electrolyte condenser, in which two condenser components are connected in parallel in the longitudinal direction at two sides of the cathode terminal. The anode terminal of the solid electrolyte condenser is formed by anode wire fixed at a pair of spacers at the two sides and is connected with the anode wire of the condenser component at each spacer. In this configuration, as compared with the solid electrolyte condenser disclosed in Patent Literature 1 discussed above, the condenser component is made into a planar shape, a sufficient connecting area of the cathode terminal with respect to the condenser component is ensured without any increase in size, and hence, it is feasible to reduce the ESR. However, when fixing the pair of spacers at the anode terminal, each spacer is fixed by resistance spot welding. Therefore, the increased amount of welding reduces manufacturing efficiency. Welding spots in close proximity to one another also causes deficient welding and welding strength degradation. These problems have already been disclosed in Patent Literature 1. Moreover, according to Patent Literature 2, regarding the two alternative processes of forming the pair of spacers and the anode terminal as a whole, or omitting the spacer and shaping the front end portion of the anode terminal as a spacer, either option involves a complicated bending process, which is problematic.

PRIOR TECHNICAL LITERATURE

Patent Literature 1

Japanese patent laid-open publication No. 2005-353709.
[Patent Literature 2]
Japanese patent laid-open publication No. 2010-147234.

BRIEF SUMMARY OF THE INVENTION

Problems to be Solved in the Present Invention

In view of the foregoing, one problem to be solved in the present invention is how to provide a solid electrolyte condenser with a reduced ESR, fewer imperfections in the welding of the anode terminal, and improved manufacturing efficiency, as well as methods of manufacturing the same.

Technical Means for Solving Problems

A solid electrolyte condenser according to the first aspect of the present invention is formed by two condenser components connected in parallel and disposed along a first direction, the thickness direction, of the solid electrolyte condenser. Each condenser component includes a porous sintered body made from valve metal configured as an anode, and an anode wire partially inserted into the porous sintered body. The condenser also includes a dielectric layer covering the porous sintered body, and a cathode portion configured as a cathode and covering the dielectric layer. The solid electrolyte condenser also includes a porous sintered body, comprising a valve metal to form an anode; an anode wire, wherein a portion of the anode wire is inserted into the porous sintered body; a dielectric layer, covering the porous sintered body; and a cathode portion, covering the dielectric layer and forming an cathode; while the solid electrolyte condenser comprises a spacer, which is conductive, wherein two ends of the spacer in the first direction are respectively connected with the anode wires; an anode terminal, fixed to a side of the spacer that is opposite to the two condenser components; a cathode terminal, connected with each of the cathode portions from the two sides in the first direction; and a sealing resin, covering the two condenser components; wherein the anode connection portion of the anode terminal that is fixed to the spacer is formed along the first direction.

According to certain embodiments of the present invention, it is preferred that the spacer comprises a pair of trench portions disposed at two ends in the first direction, and the pair of trench portions are respectively connected with the anode wires.

According to certain embodiments of the present invention, it is preferred that the pair of trench portions are opposite to each other in the first direction.

According to certain embodiments of the present invention, it is preferred that the cross-sectional shape of the trench portion is V-shaped.

According to certain embodiments of the present invention, it is preferred that the spacer comprises a Cu-containing alloy.

According to certain embodiments of the present invention, it is preferred that the porous sintered body, when viewed in the first direction from the top, has a rectangular and flat shape.

According to certain embodiments of the present invention, it is preferred that the anode wire is disposed at the center of the porous sintered body in the first direction.

According to certain embodiments of the present invention, it is preferred that the anode wire is disposed at the center of the porous sintered body in a second direction of the condenser component, wherein the second direction is a width direction of the condenser component and is perpendicular to the first direction.

According to certain embodiments of the present invention, it is preferred that the valve metal is Ta or Nb.

According to certain embodiments of the present invention, it is preferred that the anode wire and the porous sintered body comprise the same metal.

According to certain embodiments of the present invention, it is preferred that the cathode portion comprises: a solid electrolyte layer, covering the dielectric layer; a first cathode layer, covering the solid electrolyte layer; and a second cathode layer, covering the first cathode layer, wherein the second cathode layer comprises Ag.

According to certain embodiments of the present invention, it is preferred that the solid electrolyte condenser further comprises a conductive adhesive layer, wherein the conductive adhesive layer is interposed between the cathode layer and the cathode terminal.

According to certain embodiments of the present invention, it is preferred that the conductive adhesive layer comprises Ag.

According to certain embodiments of the present invention, it is preferred that the sealing resin comprises an epoxy resin comprising a glass frit.

According to certain embodiments of the present invention, it is preferred that the anode terminal comprises an anode exposed portion exposed through the sealing resin, the cathode terminal comprises a cathode exposed portion exposed through the sealing resin, and the anode exposed portion and the cathode exposed portion are both bent along the resin side surface and the resin bottom face of the sealing resin.

According to certain embodiments of the present invention, it is preferred that the anode terminal and the cathode terminal further comprise an exterior plated layer, wherein the exterior plated layer covers the anode exposed portion and the cathode exposed portion.

According to certain embodiments of the present invention, it is preferred that the exterior plated layer comprises an alloy of interlaminating Ni and Sn.

The method of manufacturing the solid electrolyte condenser according to the second aspect of the present invention is characterized as: the solid electrolyte condenser is formed from two condenser components aligned along a first direction of the thickness direction of the condenser components and connected in parallel, wherein each of the two condenser components comprises: a porous sintered body, comprising a valve metal and forming an anode; an anode wire, wherein a portion of the anode wire is inserted into the porous sintered body; a dielectric layer, covering the porous sintered body; and a cathode portion, covering the dielectric layer and forming a cathode; and the method of manufacturing the solid electrolyte condenser comprises the steps of: providing the two condenser components; fixing a spacer at an anode lead; connecting the two condenser components at a cathode lead and the spacer; and forming a sealing resin covering the two condenser components; wherein in the step of fixing the spacer, after fixing the spacer at the anode lead, performing a bending process on the end portion of the anode lead that fixes the spacer by disposing the spacer along the first direction.

According to certain embodiments of the present invention, it is preferred that in the step of fixing the spacer, the spacer is fixed at the anode lead by laser spot welding.

According to certain embodiments of the present invention, it is preferred that in the step of fixing the spacer, the bending processing is carried out by ironing and cam forming.

According to certain embodiments of the present invention, it is preferred that the step of fixing the spacer comprises the step of: after bending the end portion of the anode lead that fixes the spacer, forming a V-shaped trench portion at each end in the first direction of the spacer.

According to certain embodiments of the present invention, it is preferred that the step of connecting the condenser component comprises the steps of: connecting the cathode portion to the cathode lead; connecting the anode wire to the spacer; and cutting off the anode wire.

According to certain embodiments of the present invention, it is preferred that in the step of connecting the anode wire, after engaging the anode wire with the trench portion, the anode wire is connected with the spacer via laser spot welding.

According to certain embodiments of the present invention, it is preferred that in the step of connecting the cathode portion, after coating conductive adhesive over the cathode lead, the cathode portion is adhered to the cathode lead, thereby connecting the cathode portion to the cathode lead.

According to certain embodiments of the present invention, it is preferred that the method further comprises a step of thermosetting the conductive adhesive after the step of connecting the condenser component.

Effects of the Present Invention

The solid electrolyte condenser of the present invention comprises a spacer, wherein the spacer is conductive and is a single element that is connected with anode wires of the capacitor component at two ends of the capacitor component in the first direction (i.e., the thickness direction), wherein the anode connection portion of the anode terminal that is fixed to the spacer is formed along the first direction. Using this configuration, the spacer can be fixed to the anode connection portion using one welding process, thereby reducing the number of welding processes and in turn eliminating the problems associated with deficient welding and decreased welding strength due to the close proximity of the welded portions. Accordingly, ESR is decreased, the deficient welding is eliminated, and the manufacturing efficiency of the solid electrolyte condenser is increased.

Other features and advantages of the present invention will become more apparent in light of the detailed description below and the accompanying drawings.

DETAILED DESCRIPTION

Figure 1:
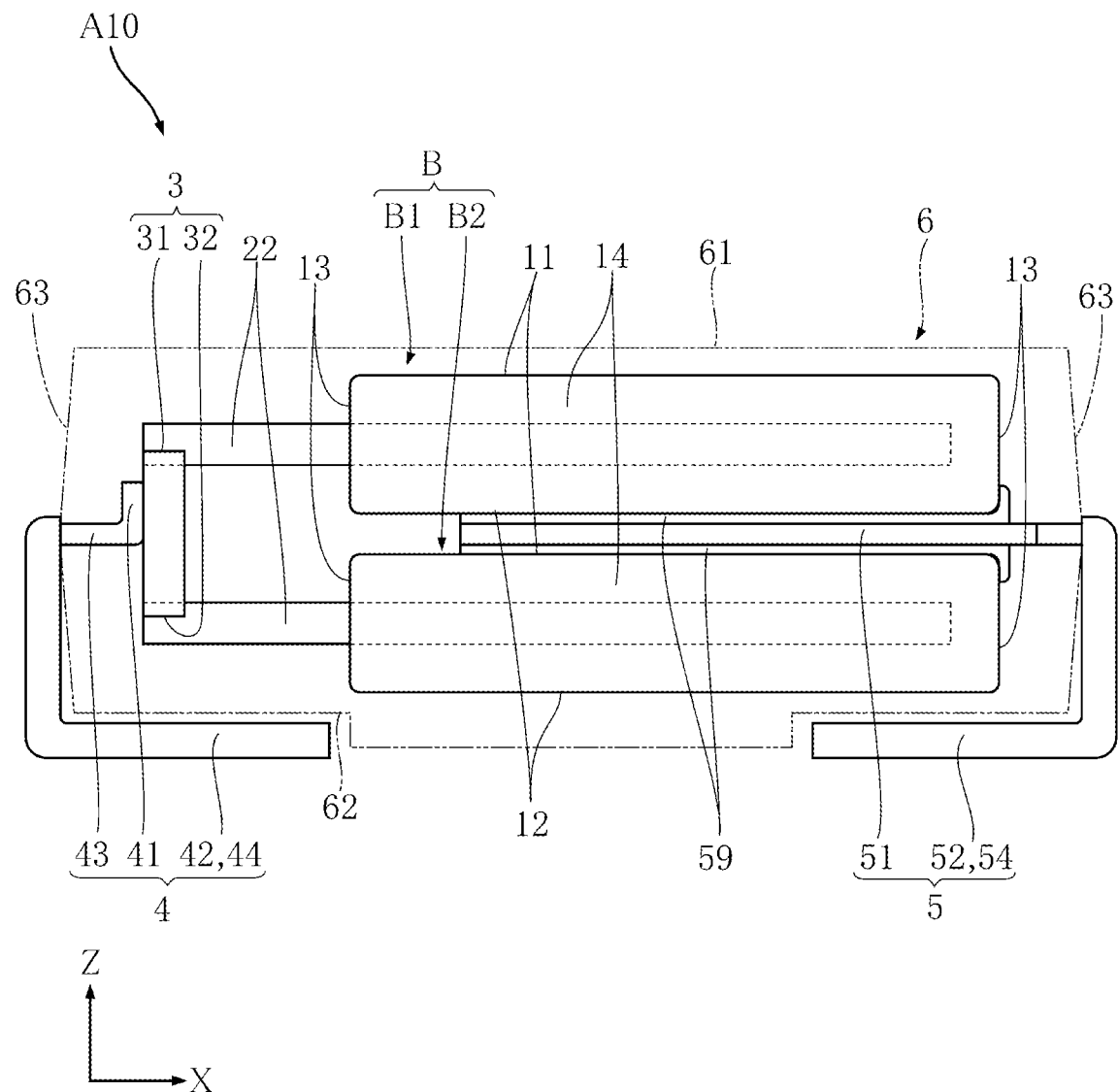
FIG. 1 is a right side view of a solid electrolyte condenser according to the present invention (sealing resin omitted).

Embodiments for implementing the present invention (hereinafter, the embodiments) are specifically discussed below by referencing to the drawings.

Embodiments of the solid electrolyte condenser A10 according to the present invention are discussed by referencing FIGS. 1 to 8. The solid electrolyte condenser A10 has two condenser components B, a spacer 3, an anode terminal 4, a cathode terminal 5, a conductive adhesion layer 59, and a sealing resin 6.

Figure 2:
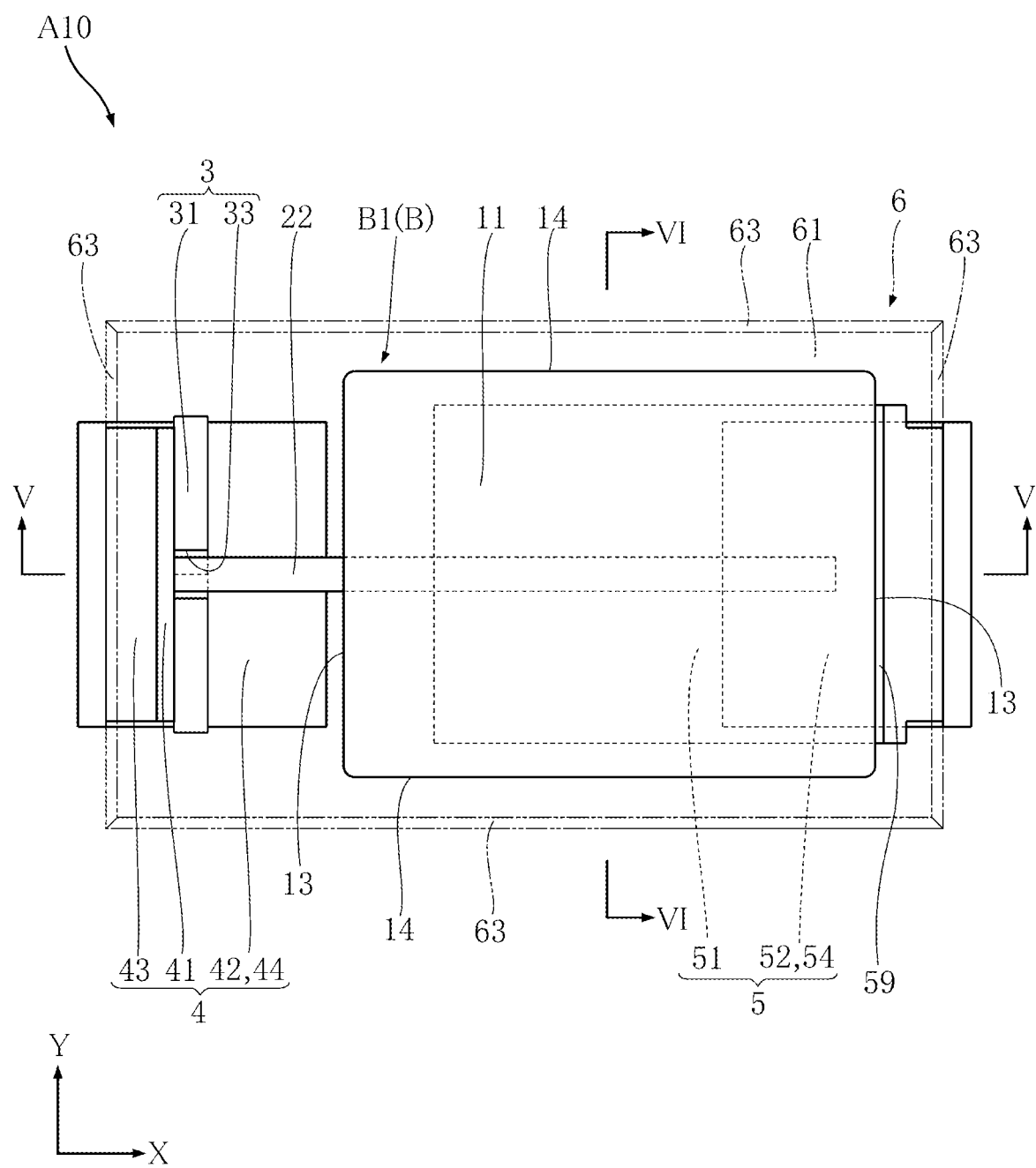
FIG. 2 is a top view of the solid electrolyte condenser illustrated in FIG. 1 (sealing resin omitted).
Figure 3:
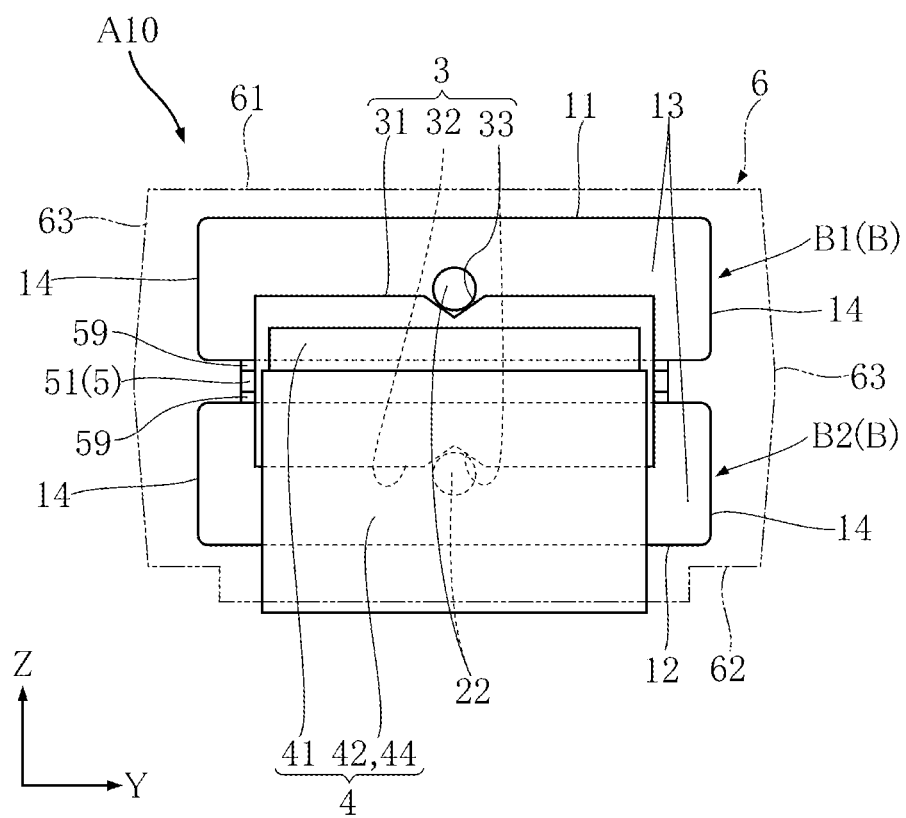
FIG. 3 is a front view of the solid electrolyte condenser illustrated in FIG. 1 (sealing resin omitted).
Figure 4:
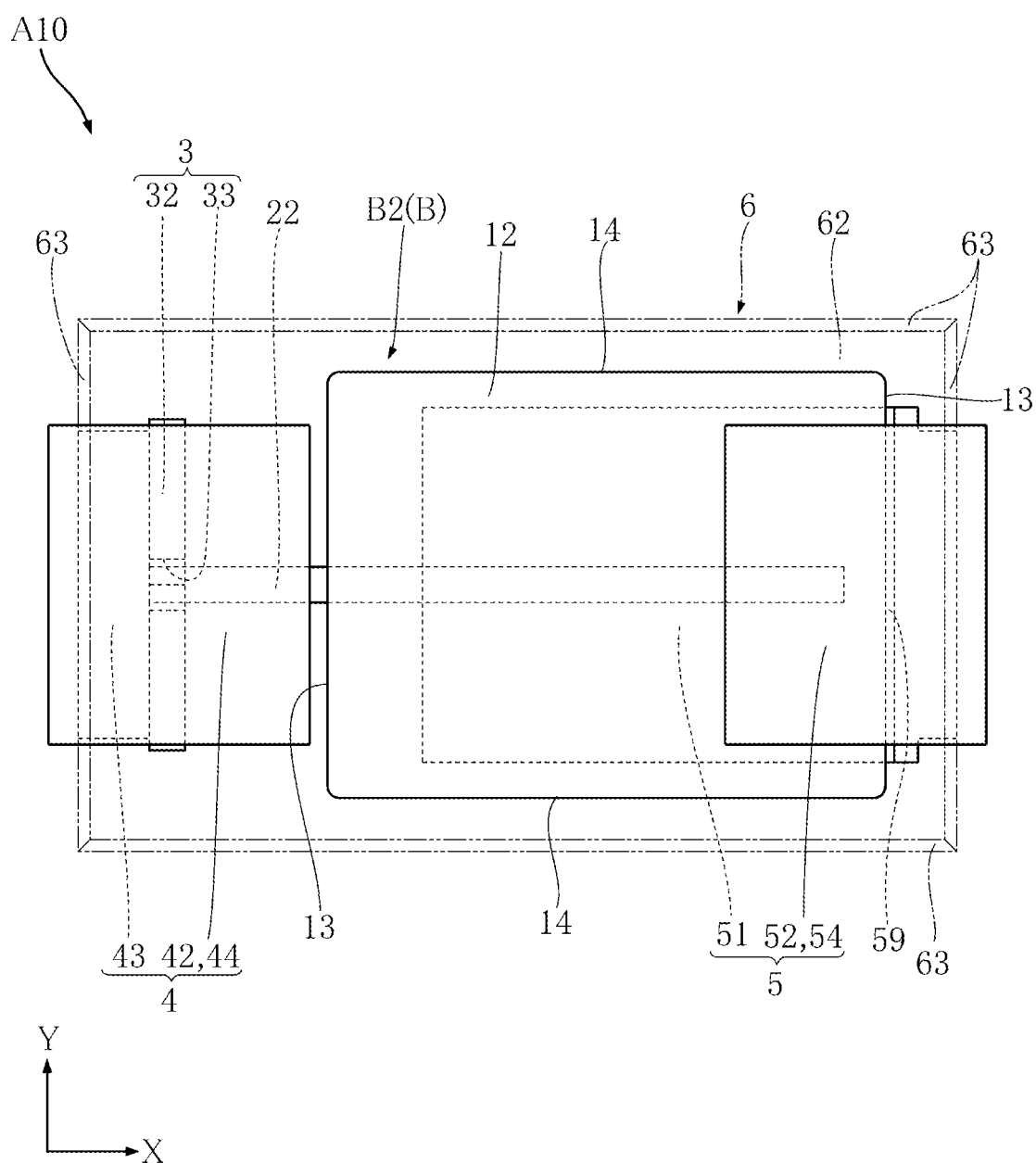
FIG. 4 is a bottom view of the solid electrolyte condenser illustrated in FIG. 1 (sealing resin omitted).
Figure 5:
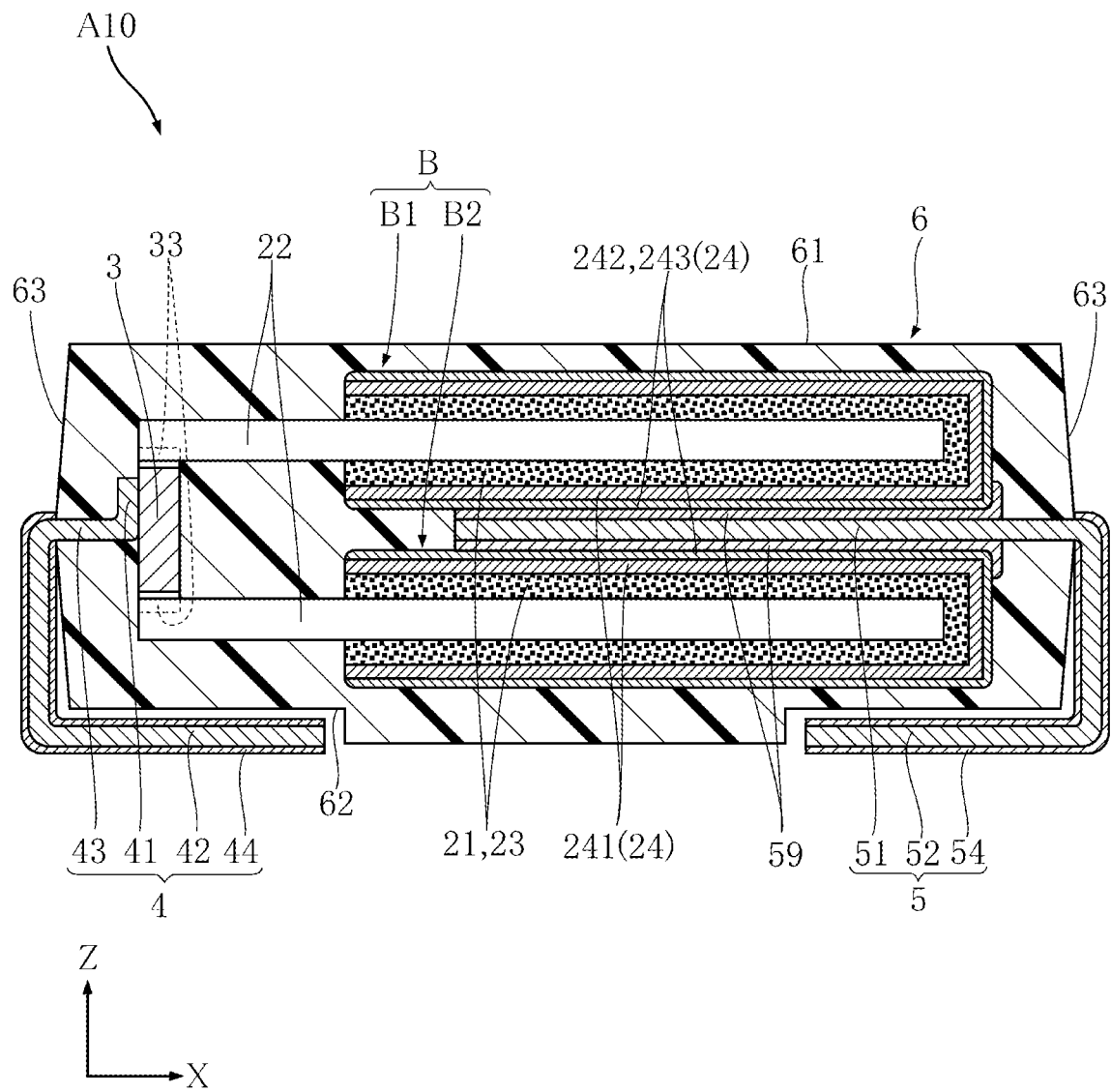
FIG. 5 is a cross-sectional view taken along line V-V in FIG. 2.
Figure 6:
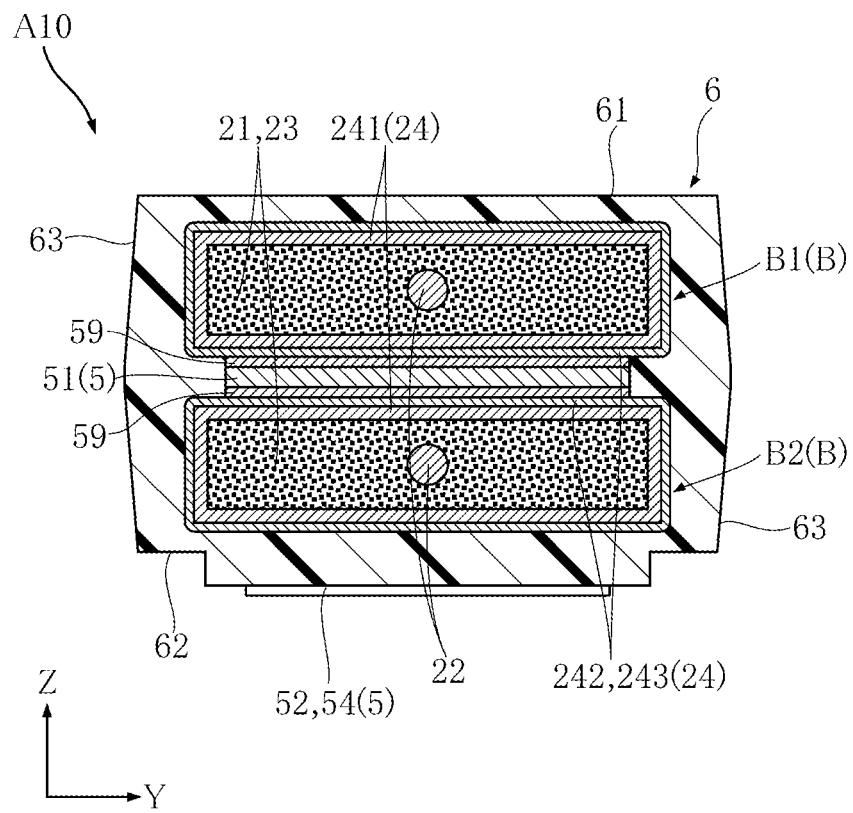
FIG. 6 is a cross-sectional view taken along line VI-VI in FIG. 2.
Figure 7:
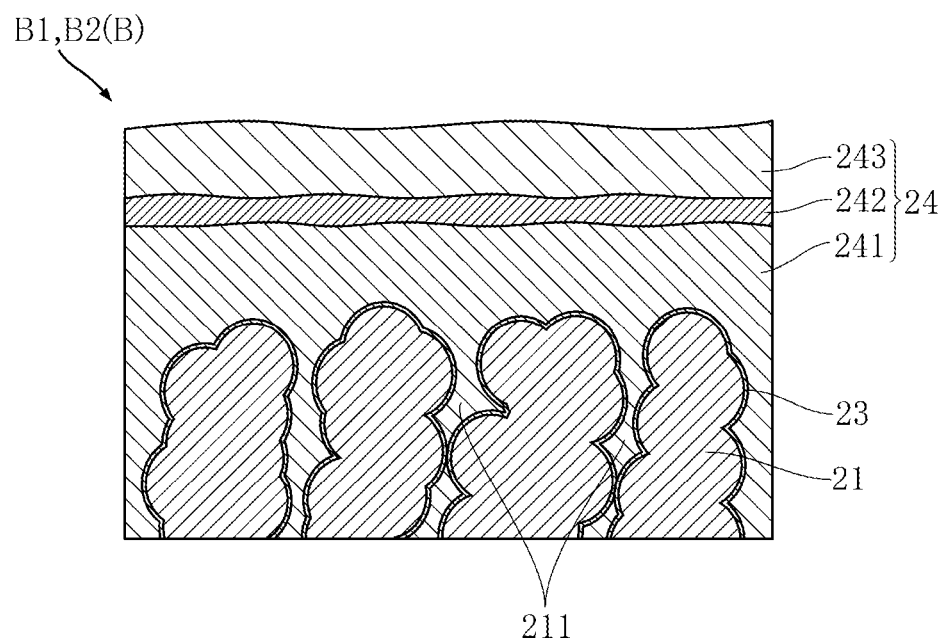
FIG. 7 is a partial enlargement view illustrating the condenser component of the solid electrolyte condenser illustrated in FIG. 1.
Figure 8:
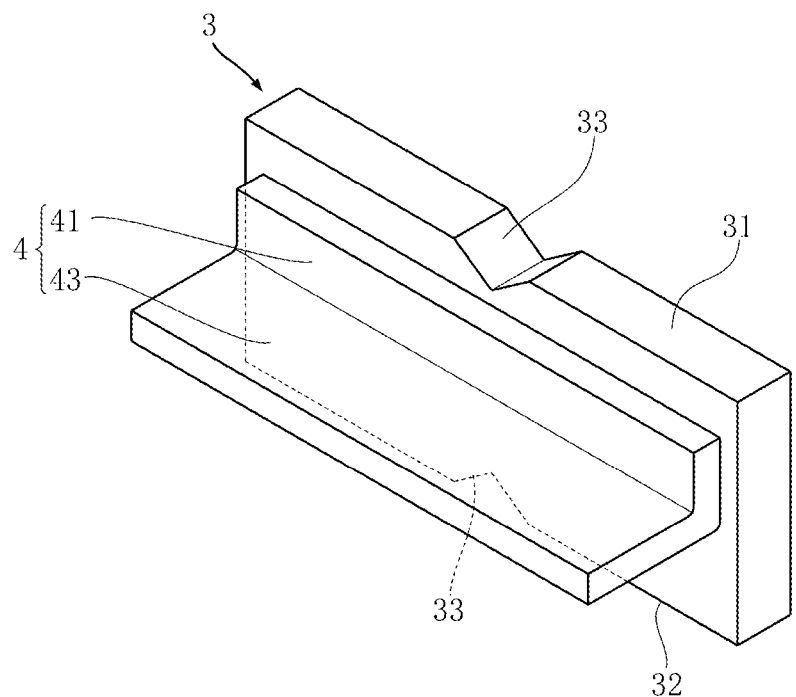
FIG. 8 is a three dimensional view illustrating a spacer and an anode terminal of the solid electrolyte condenser illustrated in FIG. 1.

FIG. 1 is the right side view of the solid electrolyte condenser A10. FIG. 2 is the top view of the solid electrolyte condenser A10. FIG. 3 is a front view of the solid electrolyte condenser A10. FIG. 4 is a bottom view of the solid electrolyte condenser A10. FIG. 5 is a cross-sectional view along line V-V in FIG. 2. FIG. 6 is a cross-sectional view along line VI-VI in FIG. 2. FIG. 7 is a partial enlargement view illustrating the condenser component B of the solid electrolyte condenser A10. FIG. 8 is a three dimensional view illustrating the spacer 3 and anode terminal 4 of the solid electrolyte condenser A10. In addition, to facilitate the understanding of the present embodiment, the sealing resin 6 is omitted in FIGS. 1 to 4, and is represented by a hypothetical line (the dotted line).

The solid electrolyte condenser A10 illustrated in these drawings is a solid electrolyte condenser resin package that is surface mounted on various circuit substrates. Throughout the present disclosure, for convenience of explanation, the thickness direction (the height direction of the solid electrolyte condenser A10) of the condenser component B is defined as the first direction Z, the width direction of the condenser component B that is perpendicular to the first direction Z is defined as the second direction Y, and the length direction of the condenser component B that is perpendicular to the first direction Z and the second direction Y is defined as the third direction X. The shape of the solid electrolyte condenser A10 in top view (observed in the first direction Z) is rectangular.

[Configuration of the Condenser Component B]

Description herein is related to the two condenser components B that mainly constitute the solid electrolyte condenser A10. In the present embodiment, the two condenser components B comprise a first condenser component B1 and a second condenser component B2. Moreover, the first condenser component B1 and the second condenser component B2 have the same configuration.

As illustrated in FIGS. 1 to 4, each of the two condenser components B has an upper surface 11, a bottom surface 12, a pair of first side surfaces 13, and a pair of second side surfaces 14. Moreover, as illustrated in FIGS. 5 to 7, each of the two condenser components B has a porous sintered body 21, an anode wire 22, a dielectric layer 23, and a cathode portion 24.

As illustrated in FIGS. 1 to 4, the upper surface 11 in FIG. 1 is the surface facing upward in the first direction Z of the condenser component B, and the bottom surface 12 in FIG. 1 is the surface facing downward in the first direction Z of the condenser component B. The upper surface 11 and the bottom surface 12 are spaced from each other and face opposite directions. The areas of the upper surface 11 and the bottom surface 12 are substantially the same. The pair of first side surfaces 13 are sandwiched between the upper surface 11 and the bottom surface 12. First side surfaces 13 are a pair of surfaces that are separated in the third direction X (the length direction of the condenser component B). The pair of first side surfaces 13 are both disposed along the second direction Y (the width direction of the condenser component B). The rod-shaped anode wire 22 protrudes from one first side surface 13 of the pair of first side surfaces 13 and along the third direction X. The pair of second side surfaces 14 are sandwiched between the upper surface 11 and the bottom surface 12, and are a pair of surfaces that are separated from each other in the second direction Y. The pair of second side surfaces 14 are both disposed along the third direction X. In the present embodiment, ignoring the anode wire 22, the condenser component B is formed to be a rectangular parallelepiped, and flat. The area of the second side surface 14 is greater than the area of the first side surface 13. Ignoring the anode wire 22, the shape of the condenser component B is rectangular when viewed from the top (observed along the first direction Z).

As illustrated in FIG. 1, in the solid electrolyte condenser A10 the first condenser component B1 and the second condenser component B2 are arranged along the first direction Z (the thickness direction of the condenser component B), and are connected in parallel at the anode terminal 4 and the cathode terminal 5. The first condenser component B1 is disposed above the second condenser component B2 in the first direction Z illustrated in FIG. 1. Accordingly, the bottom surface 12 of the first condenser component B1 and the upper surface 11 of the second condenser component B2 face each other. The front ends of respective anode wires 22 of the first condenser component B1 and the second condenser component B2 are connected with the anode terminal 4 via the spacer 3. Moreover, the bottom surface 12 of the first condenser component B1 and the upper surface 11 of the second condenser component B2 are respectively connected with the cathode terminal 5 via the conductive adhesion layer 59.

As illustrated in FIGS. 5 and 6, the porous sintered body 21 is a portion that covers a portion of the anode wire 22. The porous sintered body 21 is covered by the dielectric layer 23 and the cathode portion 24, and forms the anode of the condenser component B together with the anode wire 22. In the condenser component B, each of the porous sintered body 21, the dielectric layer 23 and the cathode portion 24 has a uniform thickness. The thickness of the porous sintered body 21 is configured to be substantially greater than the thickness of the dielectric layer 23 or the cathode portion 24. Ignoring the anode wire 22, the shape of the condenser component B is based on the shape of the porous sintered body 21. Therefore, the shape of the porous sintered body 21 is parallelepiped and flat. Hence, the shape of the porous sintered body 21, when viewed from the top (in the first direction Z), is rectangular. The porous sintered body 21 comprises a valve metal, and in the present embodiment the valve metal comprises Ta or Nb. As illustrated in FIG. 7, a plurality of fine pores 211 are formed on the surface of the porous sintered body 21. The surface area of the porous sintered body 21 is increased because of these fine pores 211.

As illustrated in FIGS. 5 and 6, the anode wire 22 has a rod-like shape and a circular cross-sectional shape, wherein a portion of the anode wire 22 is inserted into the porous sintered body 21. In the present embodiment, the anode wire 22 is disposed at the center of the porous sintered body 21 in the first direction Z and the second direction Y. In the present embodiment, the anode wire 22 comprises a metal that is the same as that of the porous sintered body 21; that is, the same valve metal (i.e., Ta or Nb).

As illustrated in FIGS. 5 and 6, the dielectric layer 23 is the portion that covers the porous sintered body 21. Moreover, as illustrated in FIG. 7, the dielectric layer 23 is formed by oxidizing the surface of the porous sintered body 21. Hence, the dielectric layer 23 is the oxide of the valve metal. In the present embodiment, the dielectric layer 23 comprises $Ta_2O_5$ or $Nb_2O_5$.

As illustrated in FIGS. 5 to 7, the cathode portion 24 is formed by interlaminating a solid electrolyte layer 241, a first cathode layer 242 and a second cathode layer 243. The cathode portion 24 covers the dielectric layer 23 and forms the cathode of the condenser component B. The solid electrolyte layer 241 is the portion that fills the fine pore 211 of the porous sintered body 21 and covers the dielectric layer 23. The solid electrolyte layer 241 comprises, for example, $MnO_2$ or a conductive polymer. During the operation of the solid electrolyte condenser A10, charges accumulate at the interface between the dielectric layer 23 and the solid electrolyte layer 241. The first cathode layer 242 is the portion that covers the solid electrolyte layer 241 and conducts with the solid electrolyte layer 241. The first cathode layer 242 comprises, for example, graphite. The second cathode layer 243 is the portion that covers the first cathode layer 242 and conducts with the solid electrolyte layer 241 via the first cathode layer 242. The surface of the condenser component B is configured to have the second cathode layer 243 exposed. In the present embodiment, the second cathode layer 243 comprises Ag.

[Configuration of Other Portions]

Next, in addition to the two condenser components B, disclosed herein are respective configurations of other elements in the solid electrolyte condenser A10. Other elements include a spacer 3, an anode terminal 4, a cathode terminal 5, a conductive adhesion layer 59, and a sealing resin 6.

The spacer 3 is conductive and is a single member having two ends respectively connected with the anode wire 22 in the first direction Z. As illustrated in FIGS. 3 and 8, the spacer 3 comprises an upper end 31, a lower end 32, and a pair of trench portions 33. In the present embodiment, the spacer 3 is sheet-like and includes an alloy containing Cu. The upper end 31 in FIG. 3 is the surface of the spacer 3 facing upward in the first direction Z. The trench portion 33 is formed at the center of the upper end 31. The trench portion 33 formed at the upper end 31 is connected with the anode wire 22 of the first condenser component B1. Moreover, the lower end 32 in FIG. 3 is the surface of the spacer 3 facing downward in the first direction Z. The other trench portion 33 is formed at the center of the lower end 32. The trench portion 33 formed at the lower end 32 is connected with the anode wire 22 of the second condenser component B2. Hence, the pair of trench portions 33 are opposite to each other in the first direction Z. In the present embodiment, the trench portion 33 has a cross-sectional shape of V.

The anode terminal 4 and two condenser components B are fixed on opposite sides of the spacer 3. The anode terminal 4 is a conductive member that forms the anode of the solid electrolyte condenser A10. As illustrated in FIGS. 1 to 5, the anode terminal 4 includes an anode connection portion 41, an anode exposed portion 42, an anode middle portion 43, and an exterior plated layer 44. The anode terminal 4 is a member derived from a lead frame 81 which will be described later. For example, the anode terminal 4 can be an alloy (e.g., Ni—Fe alloy) with a Cu-plated surface. The anode connection portion 41 is a front end of the anode terminal 4 and is fixed on the spacer 3. The anode connection portion 41 is formed along the first direction Z. The anode exposed portion 42 is the portion that is exposed through the sealing resin 6 and is bent conformally to the shape of the sealing resin 6. When mounting the solid electrolyte condenser A10 onto various circuit substrates, the anode exposed portion 42 is connected to the wiring pattern of the circuit substrate via solder. The anode middle portion 43 is the portion that extends along the third direction X, wherein one end thereof is connected with the anode connection portion 41, while the other end thereof is connected with the anode exposed portion 42. The anode middle portion 43 and the anode connection portion 41 are both covered by the sealing resin 6. As illustrated in FIG. 5, the exterior plated layer 44 is the portion that covers the anode exposed portion 42. In the present embodiment, the exterior plated layer 44 comprises an alloy of interlaminating Ni and Sn. When mounting the solid electrolyte condenser A10 onto various circuit substrates, the exterior plated layer 44 is configured to protect the anode exposed portion 42 from the thermal shock damage caused by reflow soldering, etc., and to maintain the wettability of the solder.

The cathode terminal 5 is a conductive element that forms the cathode of the solid electrolyte condenser A10, wherein two ends thereof in the first direction Z are connected with the respective cathode portions 24 of the two condenser components B. As illustrated in FIGS. 1 to 5, the cathode terminal 5 comprises a cathode connection portion 51, a cathode exposed portion 52, and an exterior plated layer 54. The cathode terminal 5, like the anode terminal 4, is a member derived from the later mentioned lead frame 81 and has the same material as the anode terminal 4. The cathode connection portion 51 is a member that extends along the third direction X and connects with two condenser components B, i.e., the first condenser component B1 and the second condenser component B2. As illustrated in FIG. 1 and FIG. 5, the cathode portion 24, which is equivalent to the bottom surface 12 of the first condenser component B1, is connected to the upward-facing surface of the cathode connection portion 51 in the first direction Z, via the conductive adhesion layer 59. Similarly, the cathode portion 24, which is equivalent to the upper surface 11 of the second condenser component B2, is connected to the downward-facing surface of the cathode connection portion 51 in the first direction Z, as illustrated in FIG. 1 and FIG. 5, via the conductive adhesion layer 59. Further, like the anode exposed portion 42, the cathode exposed portion 52 is also exposed through the sealing resin 6 and is bent conformally to the shape of the sealing resin 6. When mounting the solid electrolyte condenser A10 onto various kinds of circuit substrates, the cathode exposed portion 52 is connected to the wiring pattern of the circuit substrate via solder. As illustrated in FIG. 5, the exterior plated layer 54 is the portion that covers the cathode exposed portion 52. In the present embodiment, the exterior plated layer 54 and the exterior plated layer 44 have the same configuration and exhibit the same function.

The conductive adhesion layer 59 is a conductive member between the cathode portion 24 and the cathode connection portion 51 of the cathode terminal 5 of the two condenser components B. In the present embodiment, the conductive adhesion layer 59 is a synthetic resin Ag paste including Ag. The two condenser components B, i.e., the first condenser component B1 and the second condenser component B2, are conductively connected to the cathode terminal 5 via the conductive adhesion layer 59, respectively.

The sealing resin 6 is a component comprising synthetic resin and covering the two condenser components B, the spacer 3, the anode terminal 4, and the cathode terminal 5 (the anode connection portion 41, the anode middle portion 43 and the cathode connection portion 51). In the present embodiment, the sealing resin 6 comprises an epoxy resin that contains glass frit. As illustrated in FIGS. 1 to 6, the sealing resin 6 has a resin main surface 61, a resin bottom surface 62, and resin side surfaces 63. The resin main surface 61 is the upward-facing surface of the sealing resin 6 in the first direction Z, as illustrated in FIG. 5 and FIG. 6.

The resin bottom surface 62 is the downward-facing surface of the sealing resin 6 in the first direction Z, as illustrated in FIG. 5 and FIG. 6. The resin main surface 61 and the resin bottom surface 62, when viewed from the top (observed in the first direction Z), are both rectangular. The resin side surfaces 63 are four surfaces that are interposed between the resin main surface 61 and the resin bottom surface 62, and face the exterior of the solid electrolyte condenser A10. In addition, the anode exposed portion 42 and the cathode exposed portion 52 are both bent along the resin side surface 63 and the resin bottom surface 62.

Figure 12:
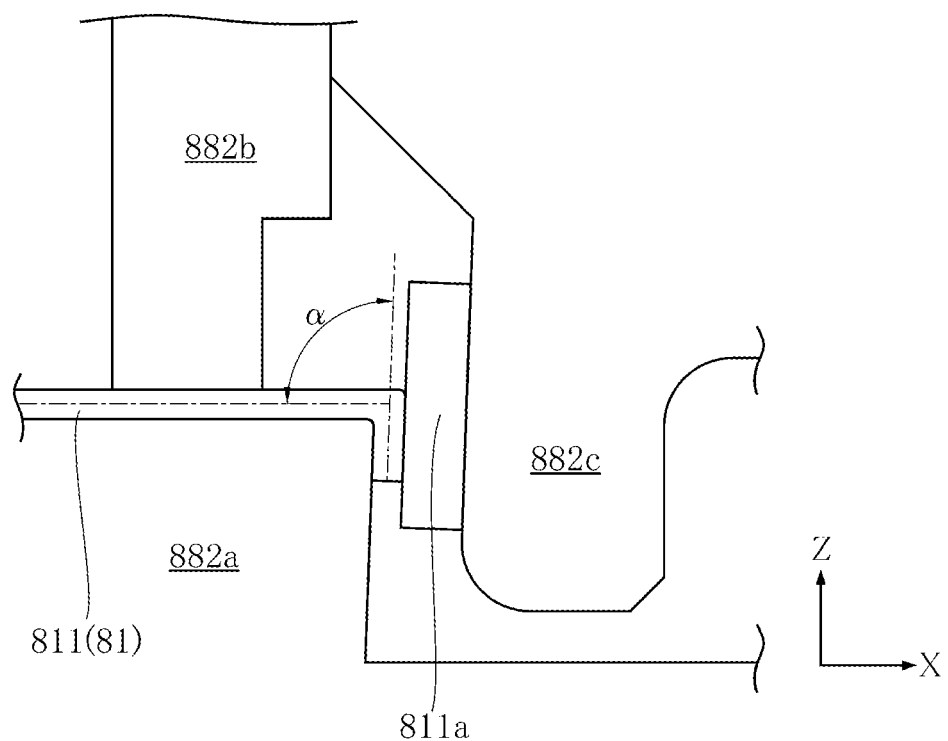
FIG. 12 is a side view illustrating the manufacturing method of the solid electrolyte condenser illustrated in FIG. 1.
Figure 13:
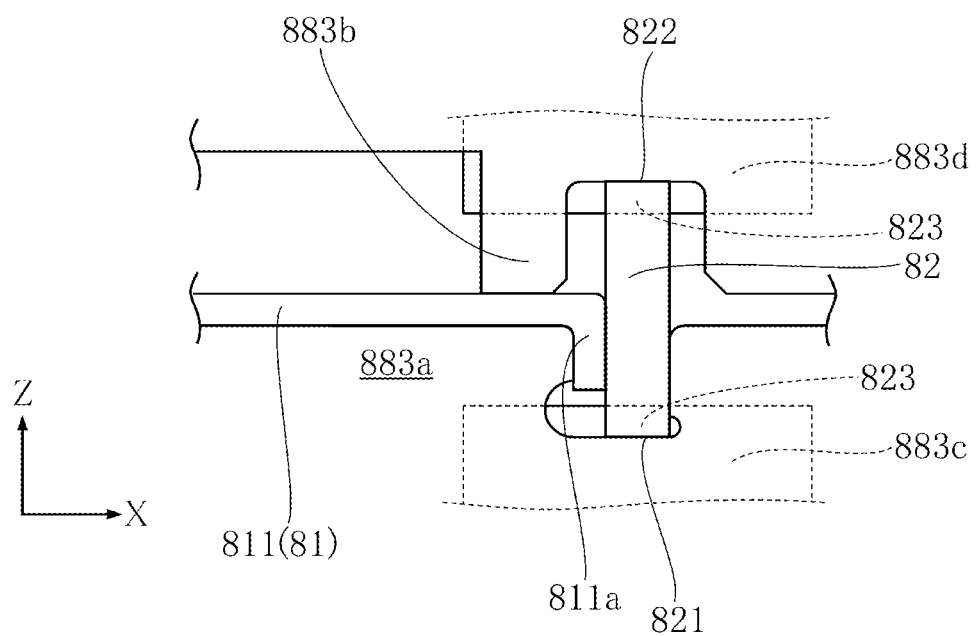
FIG. 13 is a side view illustrating the manufacturing method of the solid electrolyte condenser illustrated in FIG. 1.
Figure 14:
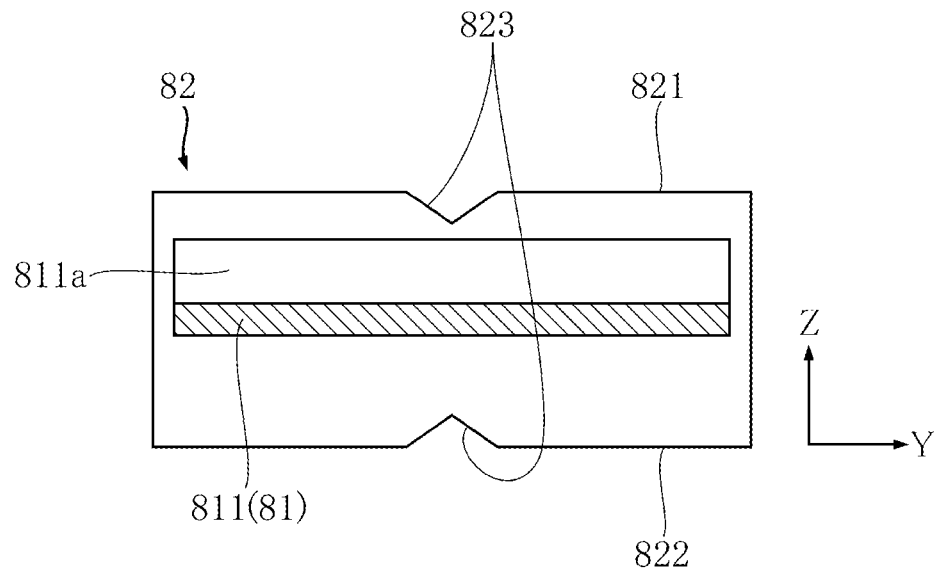
FIG. 14 is a front view illustrating the manufacturing method of the solid electrolyte condenser illustrated in FIG. 1.
Figure 15:
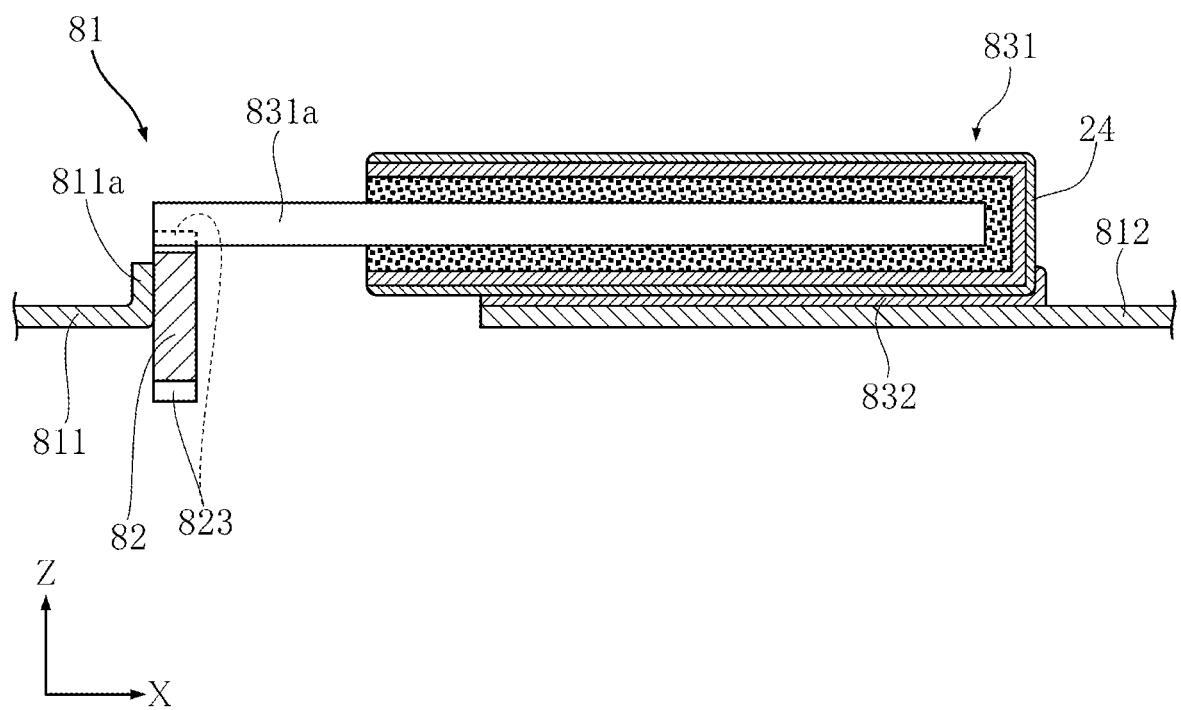
FIG. 15 is a cross-sectional view illustrating the manufacturing method of the solid electrolyte condenser illustrated in FIG. 1.
Figure 16:
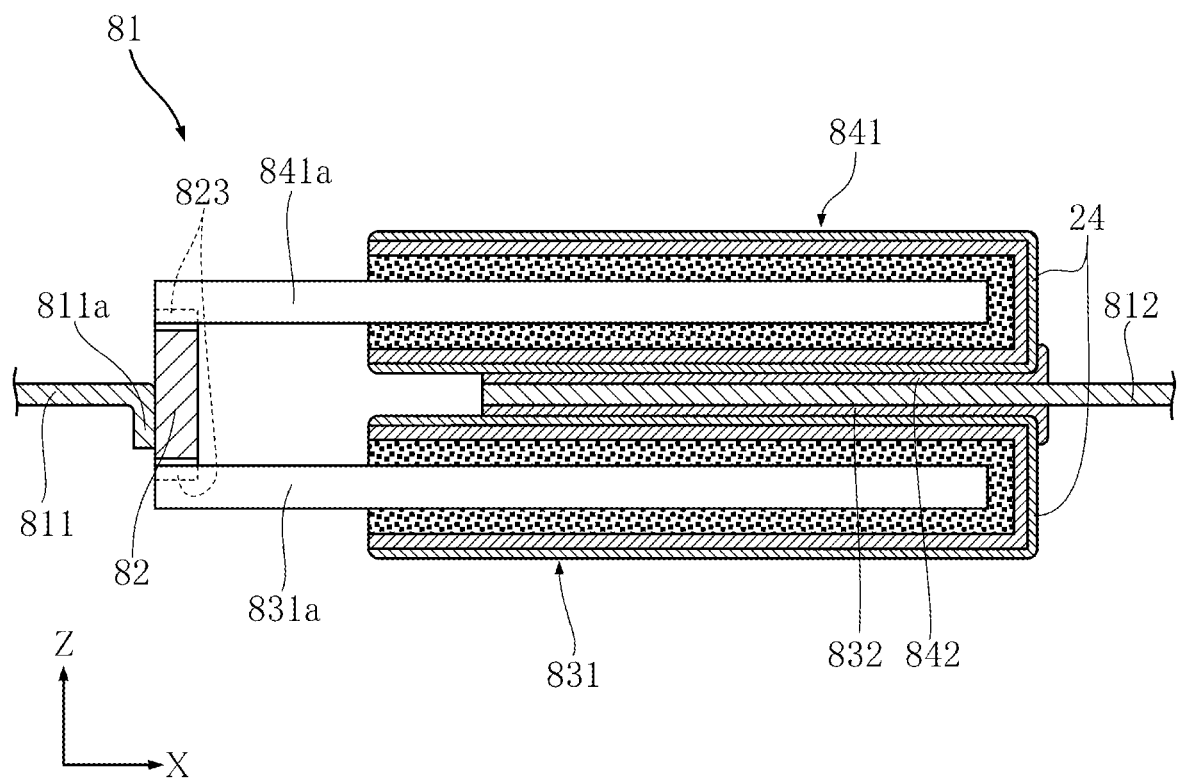
FIG. 16 is a cross-sectional view illustrating the manufacturing method of the solid electrolyte condenser illustrated in FIG. 1.
Figure 17:
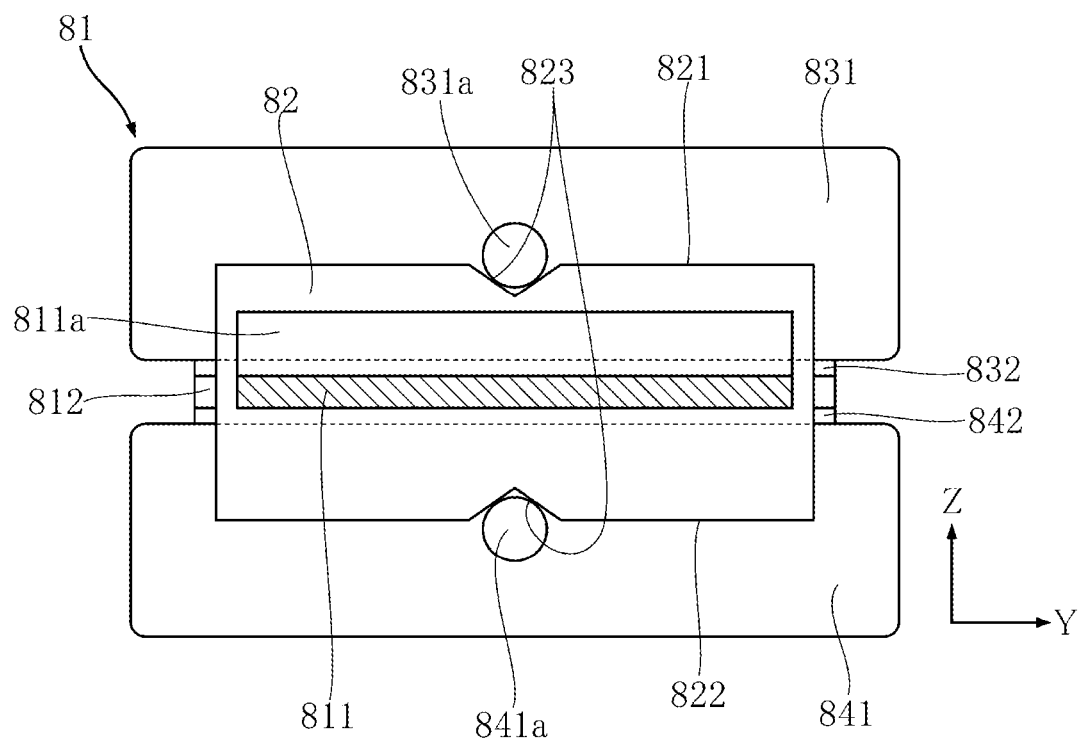
FIG. 17 is a front view illustrating the manufacturing method of the solid electrolyte condenser illustrated in FIG. 1.

Next, one example of the method of manufacturing the solid electrolyte condenser A10 can be further understood by referring to FIGS. 9 to 18. FIGS. 9, 15, 16 and 18 are cross-sectional drawings illustrating the method of manufacturing the solid electrolyte condenser A10. These cross-sectional views are shown from the same perspective as the cross-sectional view in FIG. 5. FIGS. 10 to 13 are side views illustrating the manufacturing method of the solid electrolyte condenser A10. FIG. 14 and FIG. 17 are front views observed from the later described anode lead 811. These drawings illustrate one method of manufacturing the solid electrolyte condenser A10.

Figure 9:
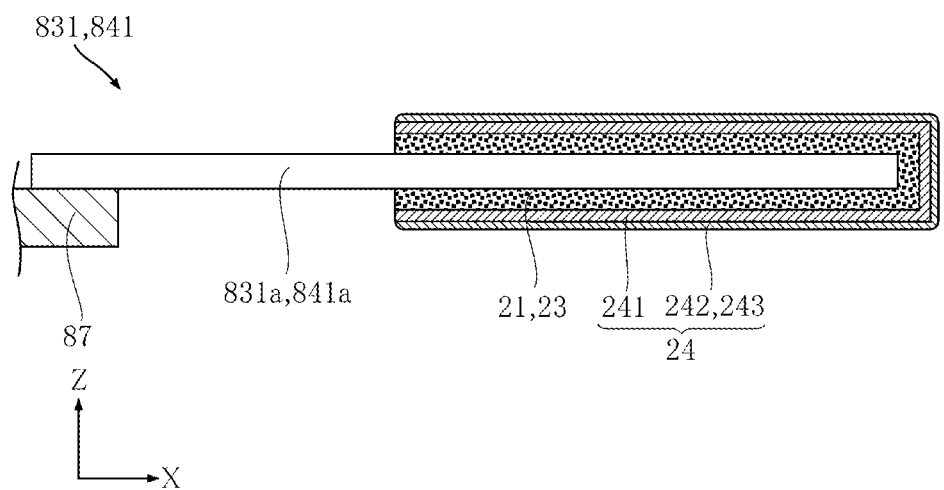
FIG. 9 is a cross-sectional view illustrating the manufacturing method of the solid electrolyte condenser illustrated in FIG. 1.

First, as illustrated in FIG. 9, the two condenser components, i.e., the first condenser component 831 and the second condenser component 841, are respectively formed. The first condenser component 831 is equivalent to the first condenser component B1 of the solid electrolyte condenser A10, and the second condenser component 841 is equivalent to the second condenser component B2 of the solid electrolyte condenser A10. The porous sintered body 21 is formed as an anode from valve metal to partially cover the first anode wire 831a and the second anode wire 841a respectively. The porous sintered body 21 is formed by filling micro-powders of valve metal (such as Ta or Nb), together with the first anode wire 831a and the second anode wire 841a, into a cast and then press molding them. In this case, it is preferable that valve metal the first anode wire 831a, second anode wire 841a, and the porous sintered body 21 are made of the same valve metal. Then, the end portions of the first anode wire 831a and the second anode wire 841a are respectively fixed to the elongated supporting element 87 by, for example, soldering. At this time, the porous sintered body 21 is suspension supported by the supporting element 87 through the first anode wire 831a or the second anode wire 841a.

Next, the dielectric layer 23 covering the porous sintered body 21 is formed. The dielectric layer 23 is formed by immersing the porous sintered body 21 in a chemical treatment solution, such as a phosphoric acid aqueous solution, to oxidize the surface of the porous sintered body 21.

Next, the cathode portion 24 is formed as a cathode and covers the dielectric layer 23. When forming the cathode portion 24, the first cathode layer 242 and the second cathode layer 243 are laminated over the solid electrolyte layer 241, after the solid electrolyte layer 241 covering the dielectric layer 23 is formed. The aforementioned $MnO_2$ solid electrolyte layer 241 is formed by immersing the porous sintered body 21 covered by the dielectric layer 23 in a manganese nitrate aqueous solution, then sintering the solid electrolyte layer 241. Moreover, the conductive polymer solid electrolyte layer 241 is polymerized by immersing the porous sintered body 21 covered by the dielectric layer 23 in an oxidant solution, then immersing the same in a solution comprising the conductive monomers, then drying the conductive polymer solid electrolyte layer 241. The first cathode layer 242 is formed by immersing the porous sintered body 21 covered by the dielectric layer 23 and the solid electrolyte layer 241 in a graphite solution using organic solvent as the solvent, then drying or sintering the first cathode layer 242. The second cathode layer 243 is formed by immersing the porous sintered body 21 covered by the dielectric layer 23, a solid electrolyte layer 241 and a first cathode layer 242 in an Ag filler solution that uses organic solvent as the solvent, then drying or sintering the second cathode layer 243. The first condenser component 831 and the second condenser component 841 are formed respectively by the aforementioned steps.

Figure 10:
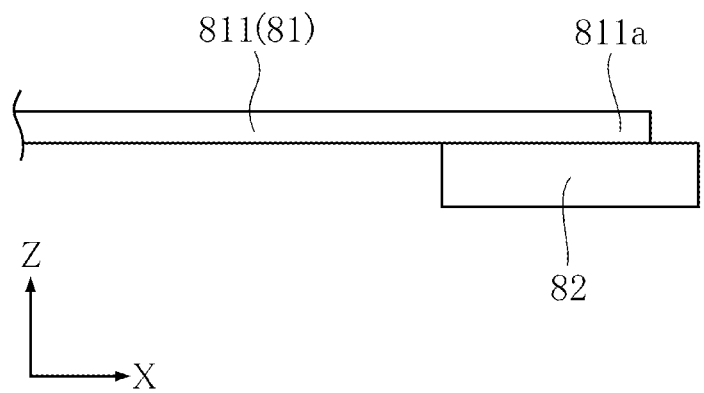
FIG. 10 is a side view illustrating the manufacturing method of the solid electrolyte condenser illustrated in FIG. 1.

Next, as illustrated in FIG. 10, a spacer 82 is fixed at an end portion 811a of the anode lead 811, which is a portion of the lead frame 81. The anode lead 811 is equivalent to the anode terminal 4 of the solid electrolyte condenser A10. The spacer 82 is equivalent to the spacer 3 of the solid electrolyte condenser A10. The lead frame 81 comprises the anode lead 811 and the later mentioned cathode lead 812, both of which extend along the third direction X as illustrated in FIG. 10. In the present embodiment, the spacer 82 is fixed to the end portion 811a of the anode lead 811 by laser spot welding. The lead frame 81 comprises, for example, an alloy (e.g., Ni—Fe alloy) in which the surface is plated with Cu. Moreover, the spacer 82 is a conductive sheet that comprises Cu-containing alloy.

Figure 11:
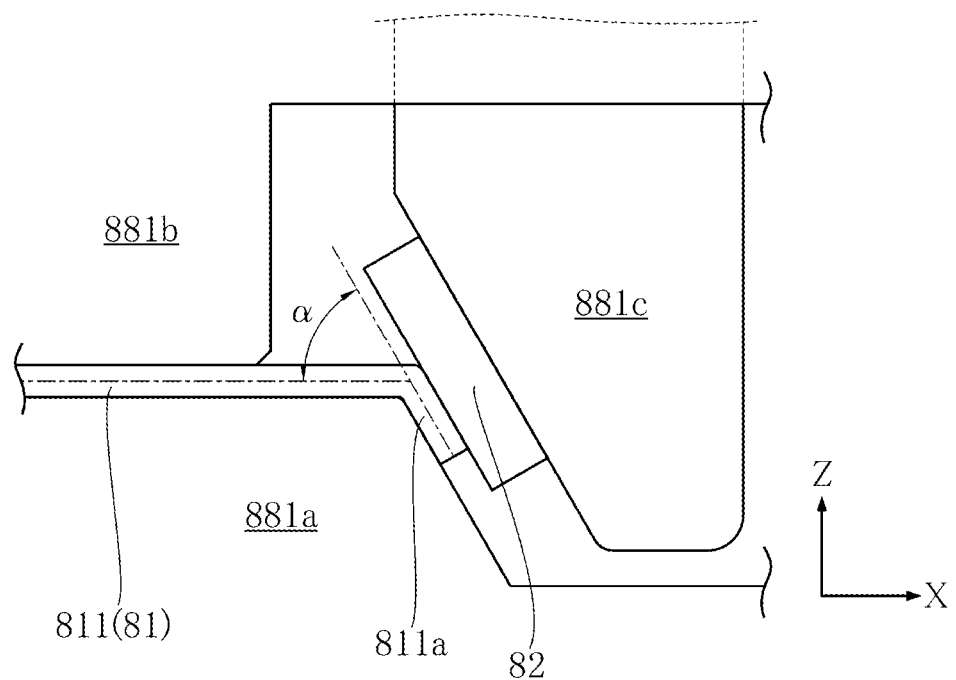
FIG. 11 is a side view illustrating the manufacturing method of the solid electrolyte condenser illustrated in FIG. 1.

Next, as illustrated in FIG. 11, an ironing step is performed. The two sides of the anode lead 811 in the first direction Z are clamped by the die block 881a and the stripper block 881b. Then a flange punch 881c contacts with the spacer 82 from the top of the first direction Z to perform a bending process on the spacer 82 attached to the end portion 811a of the anode lead 811. In this way, the bending angle between the third direction X and the extension direction of the end portion 811a (i.e., the angle of bend a of the end portion 811a) becomes, for example, 60°.

Next, as illustrated in FIG. 12, a cam forming step is performed, in which the two sides of the anode lead 811 in the first direction Z are clamped using the die block 882a and the stripper block 882b. Then a flange punch 882c contacts with the spacer 82 from top of the first direction Z to perform a bending process. In this way, the bending angle α of the end portion 811a becomes 92°. The bending angle α is increased by two degrees (2°) including the spring back angle of the end portion 811a. Next, when moving the flange punch 882c away from the spacer 82, the bending angle α of the end portion 811a becomes 90°. Accordingly, the spacer 82 is disposed along the first direction Z (the thickness direction of the first condenser component 831 and the second condenser component 841) in FIG. 12 and the end portion 811a is disposed along the first direction Z by the above-mentioned bending process comprising the ironing and cam forming steps.

Next, as illustrated in FIG. 13, cross-sectional V-shaped trench portions 823 are respectively formed at two ends (i.e., the upper end 821 and the lower end 822) of the spacer 82 in the first direction Z. When the anode lead 811 is disposed at the die block 883a, and the push block 883b is pressed against the anode lead 811 and the spacer 82 from the top of the first direction Z, then the trench portion 823 is formed at the upper end 821 using the lower portion V-notch punch 883c. The upper portion V-notch punch 883d is then pressed against the spacer 82 to form the trench portion 823 at the lower end 822. The trench portions 823 are formed in the upper end 821 and the lower end 822, as illustrated in FIG. 14.

As illustrated in FIG. 15, the first condenser component 831 is connected to the spacer 82 and the cathode lead 812, the latter of which is a portion of the lead frame 81. The cathode lead 812 is equivalent to the cathode terminal 5 of the solid electrolyte condenser A10. Next, the cathode portion 24 of the first condenser component 831 is connected to the cathode lead 812. The connection between the cathode portion 24 of the first condenser component 831 and the cathode lead 812 is formed by coating a first conductive adhesive 832 (such as Ag paste) on the cathode lead 812, then the cathode portion 24 of the first condenser component 831 is adhered to the cathode lead 812. Then, as illustrated in FIG. 17, after engaging the first anode wire 831a with the trench portion 823 formed at the upper end 821 of the spacer 82, the first anode wire 831a is connected with the spacer 82 using laser spot welding. Finally, the redundant portion of the first anode wire 831a that is fixed to the supporting element 87 is cut off.

As illustrated in FIG. 16, like the first condenser component 831, the second condenser component 841 is connected to the cathode lead 812 and spacer 82. First, the lead frame 81 is turned upside down, and the cathode portion 24 of the second condenser component 841 is connected to the cathode lead 812. The connection between the cathode portion 24 of the second condenser component 841 and the cathode lead 812 is formed by coating a second conductive adhesive 842 (such as Ag paste) on the cathode lead 812, and the cathode portion 24 of the second condenser component 841 is adhered to the cathode lead 812. Next, as illustrated in FIG. 17, after engaging the second anode wire 841a with the trench portion 823 at the lower end 822 of the spacer 82, the second anode wire 841a is connected with the spacer 82 using laser spot welding. Finally, the redundant portion of the second anode wire 841a that is fixed to the supporting element 87 is cut off. By the above-mentioned steps, the first condenser component 831 and the second condenser component 841 are arranged along the first direction Z and connected in parallel at the cathode lead 812 and the spacer 82.

The lead frame 81, connected with the first condenser component 831 and the second condenser component 841 as illustrated in FIG. 16, is placed in a curing furnace, so that the first conductive adhesive 832 and the second conductive adhesive 842 are thermoset. During this step, the first condenser component 831 and the second condenser component 841 are both fixed to the cathode lead 812. Moreover, the cured first conductive adhesive 832 and the cured second conductive adhesive 842 are both equivalent to the conductive adhesion layer 59 of the solid electrolyte condenser A10.

Figure 18:
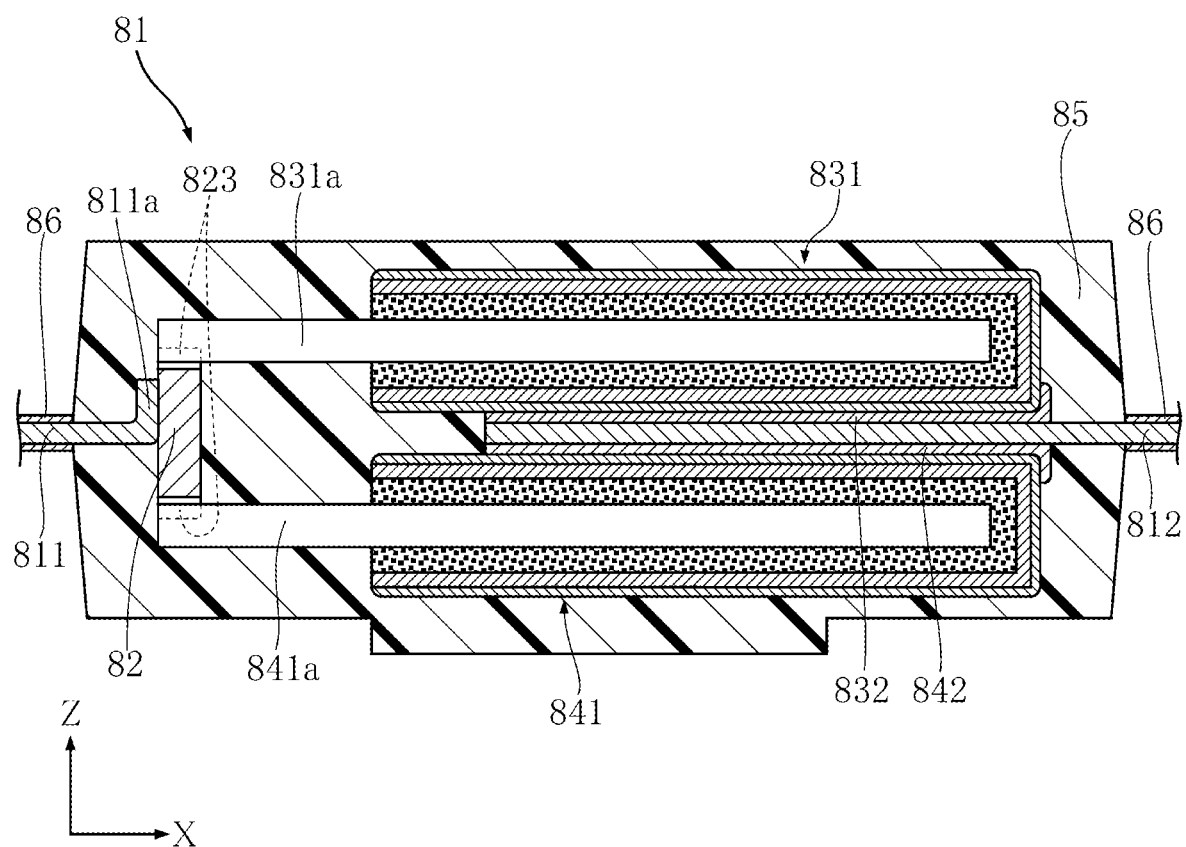
FIG. 18 is a cross-sectional view illustrating the manufacturing method of the solid electrolyte condenser illustrated in FIG. 1.

Next, as illustrated in FIG. 18, a sealing resin 85 covering the first condenser component 831 and the second condenser component 841 is formed at the lead frame 81. The sealing resin 85 is equivalent to the sealing resin 6 of the solid electrolyte condenser A10. In the present embodiment, the sealing resin 85 is formed by transfer molding, in which a flowable epoxy resin mixed with glass frit is thermoset. In this way, a portion of each of the anode lead 811 and the cathode lead 812 are exposed through the side surface of the sealing resin 85. Next, an exterior plated layer 86 covering the portions of anode lead 811 and cathode lead 812 that are exposed through the sealing resin 85 is formed by electroplating. The exterior plated layer 86 is equivalent to the exterior plated layer 44 of the anode terminal 4 and the exterior plated layer 54 of the cathode terminal 5 of the solid electrolyte condenser A10. After forming the Ni-plated layer, an Sn-containing alloy-plated layer is formed, thereby forming the exterior plated layer 86.

Lastly, the anode lead 811 and the cathode lead 812 are separated from the lead frame 81. The anode lead 811 and the cathode lead 812 covered by the exterior plated layer 86 undergo a bending process to match the shape of the sealing resin 85. The manufacture of the solid electrolyte condenser A10 is thus complete.

Some functional effects of the solid electrolyte condenser A10 are described as follows.

The solid electrolyte condenser A10 comprises a spacer 3. The spacer 3 is conductive and comprises a single member. The spacer 3 has two ends in the first direction Z that are respectively connected with the anode wires 22. The anode connection portion 41 of the anode terminal 4 is fixed on the spacer 3 and formed along the first direction Z. Using this configuration, the spacer 3 can be fixed to the anode connection portion 41 using only one welding process, and therefore, the number of welding processes according to the present disclosure is reduced to fewer than that of the manufacturing method disclosed by Patent Literature 2. Problems of deficient welding and decreased welding strength due to the close proximity of the welded portions can be eliminated. Accordingly, the ESR is reduced, deficient welding of the anode terminal 4 is avoided, and the manufacturing efficiency of the solid electrolyte condenser A10 is improved.

A pair of trench portions 33 with V-shaped cross-sections are formed at two ends (the upper end 31 and the lower end 32) of the spacer 3 in the first direction Z. The trench portion 33 with this shape is advantageous in that, during the manufacture of the solid electrolyte condenser A10, the trench portion 33 can connect the first anode wire 831*a* and the second anode wire 841*a* to the spacer 82 in the correct position. Further, through this connection, it is possible to reduce the need for additional manipulation such as bending to be applied on the relatively low strength first anode wire 831*a* and second anode wire 841*a*.

The shape of the porous sintered body 21 of the two condenser components B, i.e., the first condenser component B1 and the second condenser component B2, when viewed in the first direction Z (that is, from the top), is rectangular and flat. Moreover, the two sides of the cathode terminal 5 in the first direction Z are connected with the cathode portions 24 of the first condenser component B1 and the second condenser component B2 respectively. Using this configuration, it is feasible to ensure sufficient contact area of the cathode terminal 5 with the first condenser component B1 and the second condenser component B2 without the increase in size of the solid electrolyte condenser A10, thereby effectively reducing the ESR.

If the sealing resin 6 is cracked and the crack expands into the cathode portions 24 of the first condenser component B1 or the second condenser component B2, the ESR of the solid electrolyte condenser A10 may increase. Accordingly, by using an epoxy resin mixed with the glass frit to form the sealing resin 6, it is feasible to increase the strength of the sealing resin 6 and prevent the sealing resin 6 from cracking.

During the manufacture of the solid electrolyte condenser A10, the bending of the end portion 811*a* is performed by fixing a space 82 at the end portion 811*a* of the anode lead 811 along the first direction Z. Moreover, the bending process is carried out by ironing and cam forming. Using such bending process, it is feasible to reduce the mechanical load imposed on the end portion 811*a*. By disposing the spacer 82 along the first direction Z, it is feasible to bend the end portion 811*a* with a high efficiency. Therefore, as compared with the manufacturing method disclosed in Patent Literature 2, the present method is easier to process the anode lead 811, and the spacer 82 can be configured effectively with a fewer number of welding processes.

The present invention is not limited to the above-mentioned embodiments. The specific content of each portion of the present invention can be freely modified.

What is claimed is:

1. A solid electrolyte condenser, comprising:
    two condenser components aligned along a first direction, which is the height direction of the condenser components and connected in parallel, wherein each of the two condenser components comprises: a porous sintered body, comprising a valve metal to form an anode; an anode wire, wherein a portion of the anode wire is inserted into the porous sintered body; a dielectric layer, covering the porous sintered body; and a cathode portion, covering the dielectric layer and forming a cathode;
    a sealing resin, covering the two condenser components;
    a conductive spacer comprising a continuous sheet including two trench portions, wherein two ends of the spacer in the first direction are respectively connected with the anode wires, and the recessing direction of the two trench portions are opposite to each other along the first direction;
    an anode terminal, fixed to a side of the spacer that is opposite to the two condenser components, wherein the anode terminal is fixed to a central region directly between the two trench portions along the first direction; and
    a cathode terminal, connected with each of the cathode portions from the two sides in the first direction, wherein the cathode terminal comprises a first portion and a second portion overlapping with the first portion when viewed in the first direction, wherein one of the two condenser components is between the first portion and the second portion of the cathode terminal, the second portion of the cathode terminal exposed from the sealing resin;
    wherein
    an anode connection portion of the anode terminal that is fixed to the spacer is formed along the first direction.

2. The solid electrolyte condenser of claim 1, wherein the two trench portions are disposed at two ends in the first direction, and the two trench portions are respectively connected with the anode wires.

3. The solid electrolyte condenser of claim 1, wherein the cross-sectional shape of each of the trench portion is V-shaped.

4. The solid electrolyte condenser of claim 1, wherein the spacer comprises a Cu-containing alloy.

5. The solid electrolyte condenser of claim 1, wherein the porous sintered body, when viewed in the first direction from the top, has a rectangular and flat shape.

6. The solid electrolyte condenser of claim 5, wherein the anode wire is disposed at the center of the porous sintered body in the first direction.

7. The solid electrolyte condenser of claim 6, wherein the anode wire is disposed at the center of the porous sintered body in a second direction of the condenser component, wherein the second direction is a width direction of the condenser component and is perpendicular to the first direction.

8. The solid electrolyte condenser of claim 1, wherein the valve metal is Ta or Nb.

9. The solid electrolyte condenser of claim 8, wherein the anode wire and the porous sintered body comprise the same metal.

10. The solid electrolyte condenser of claim 1, wherein the cathode portion comprises: a solid electrolyte layer, covering the dielectric layer; a first cathode layer, covering the solid electrolyte layer; and a second cathode layer, covering the first cathode layer, wherein the second cathode layer comprises Ag.

11. The solid electrolyte condenser of claim 1, further comprising a conductive adhesion layer, wherein the conductive adhesion layer is interposed between the cathode layer and the cathode terminal.

12. The solid electrolyte condenser of claim 11, wherein the conductive adhesion layer comprises Ag.

13. The solid electrolyte condenser of claim 1, wherein the sealing resin comprises an epoxy resin comprising a glass frit.

14. The solid electrolyte condenser of claim 1, wherein the anode terminal comprises an anode exposed portion exposed through the sealing resin, the cathode terminal comprises a cathode exposed portion exposed through the sealing resin, and the anode exposed portion and the cathode exposed portion are both bent along the resin side surface and the resin bottom face of the sealing resin.

15. The solid electrolyte condenser of claim 14, wherein the anode terminal and the cathode terminal further comprise an exterior plated layer, wherein the exterior plated layer covers the anode exposed portion and the cathode exposed portion.

16. The solid electrolyte condenser of claim 15, wherein the exterior plated layer comprises an alloy of interlaminating Ni and Sn.

17. A solid electrolyte condenser, comprising:
two condenser components aligned along a first direction, which is the height direction of the condenser components and connected in parallel, wherein each of the two condenser components comprises: a porous sintered body, comprising a valve metal to form an anode; an anode wire, wherein a portion of the anode wire is inserted into the porous sintered body; a dielectric layer, covering the porous sintered body; and a cathode portion, covering the dielectric layer and forming a cathode;
a sealing resin, covering the two condenser components;
a conductive spacer comprising a continuous sheet including a two trench portions, wherein two ends of the spacer in the first direction are respectively connected with the anode wires, and the recessing direction of the two trench portions are opposite to each other along the first direction;
an anode terminal, fixed to a side of the spacer that is opposite to the two condenser components, wherein the anode terminal is fixed to a central region directly between the two trench portions along the first direction, the anode terminal comprises:
an anode exposed portion, exposed from the sealing resin;
an anode middle portion, penetrating a portion of the sealing resin between the anode exposed portion and the spacer; and
an anode connection portion disposed above a surface of the spacer and directly connecting the anode middle portion and the spacer, wherein the anode connection portion extends along the first direction and is between each of the anode wire of the two condenser components from a front view perspective; and
a cathode terminal, connected with each of the cathode portions from the two sides in the first direction.

* * * * *